(12) United States Patent
Nishimura et al.

(10) Patent No.: US 11,928,751 B2
(45) Date of Patent: Mar. 12, 2024

(54) METHOD, DEVICE, AND PROGRAM FOR DETERMINING LOADING PROCEDURES FOR LOADING PRODUCTS INTO A VEHICLE

(71) Applicant: Toyota Jidosha Kabushiki Kaisha, Toyota (JP)

(72) Inventors: Kazuya Nishimura, Anjyo (JP); Shin Sakurada, Toyota (JP); Yuko Mizuno, Nagoya (JP); Josuke Yamane, Nisshin (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 17/402,943

(22) Filed: Aug. 16, 2021

(65) Prior Publication Data
US 2022/0101470 A1     Mar. 31, 2022

(30) Foreign Application Priority Data

Sep. 29, 2020    (JP) ................................. 2020-164160

(51) Int. Cl.
| | |
|---|---|
| *G06Q 10/0832* | (2023.01) |
| *G05B 19/042* | (2006.01) |
| *G06Q 10/0631* | (2023.01) |
| *G06Q 30/0601* | (2023.01) |
| *G06Q 50/28* | (2012.01) |
| *B65G 67/04* | (2006.01) |
| *H04L 67/12* | (2022.01) |

(52) U.S. Cl.
CPC ........... *G06Q 50/28* (2013.01); *G05B 19/042* (2013.01); *G06Q 10/06315* (2013.01); *G06Q 10/0832* (2013.01); *G06Q 30/0633* (2013.01); *B65G 67/04* (2013.01); *G05B 2219/2637* (2013.01); *H04L 67/12* (2013.01)

(58) Field of Classification Search
CPC ...................................................... G06Q 50/28
See application file for complete search history.

(56) References Cited

U.S. PATENT DOCUMENTS

| | | | |
|---|---|---|---|
| 2007/0257774 A1* | 11/2007 | Stumpert | ............... G06Q 10/08 340/7.1 |
| 2016/0304299 A1* | 10/2016 | Daun | ..................... G06Q 50/28 |

(Continued)

FOREIGN PATENT DOCUMENTS

| | | |
|---|---|---|
| JP | 2003-022327 A | 1/2003 |
| JP | 2019-106057 A | 6/2019 |
| JP | 2019-159397 A | 9/2019 |

OTHER PUBLICATIONS

"Method for Autonomous Delivery of Packages"; IP.com Journal; Sep. 14, 2018; https://priorart.ip.com/IPCOM/000255293 (Year: 2018).*

*Primary Examiner* — Rupangini Singh
*Assistant Examiner* — David G. Godbold
(74) *Attorney, Agent, or Firm* — Dinsmore & Shohl LLP (57) ABSTRACT

A method that is executed by an information processing device includes acquiring first information regarding a vehicle, acquiring second information regarding a first product selected by a user, deciding a procedure for loading the first product into the vehicle based on the first information and the second information, and performing notification of the procedure for loading the first product.

18 Claims, 7 Drawing Sheets

(56) References Cited

U.S. PATENT DOCUMENTS

| | | | |
|---|---|---|---|
| 2016/0379165 A1* | 12/2016 | Moakley | G06Q 10/0833 |
| | | | 705/333 |
| 2018/0018619 A1* | 1/2018 | Kisiler | G06Q 10/083 |
| 2018/0348792 A1* | 12/2018 | O'Brien | G05D 1/0293 |
| 2019/0071917 A1* | 3/2019 | Neudecker | B60R 25/24 |
| 2019/0152376 A1* | 5/2019 | Schwartz | G06Q 10/083 |
| 2019/0176754 A1 | 6/2019 | Kaneichi et al. | |
| 2020/0164510 A1* | 5/2020 | Gong | B25J 9/1633 |
| 2020/0283245 A1* | 9/2020 | Gualtieri | B65G 65/30 |
| 2021/0019699 A1* | 1/2021 | Bornski | G05D 1/0022 |

\* cited by examiner

| ACCOUNT INFORMATION | SETTLEMENT INFORMATION | PRODUCT INFORMATION | VEHICLE INFORMATION | DRIVING BEHAVIOR INFORMATION |

METHOD, DEVICE, AND PROGRAM FOR DETERMINING LOADING PROCEDURES FOR LOADING PRODUCTS INTO A VEHICLE

CROSS-REFERENCE TO RELATED APPLICATION

This application claims priority to Japanese Patent Application No. 2020-164160 filed on Sep. 29, 2020, incorporated herein by reference in its entirety.

BACKGROUND

1. Technical Field

The present disclosure relates to a method, an information processing device, and a program.

2. Description of Related Art

Conventionally, a technique for deciding a procedure for loading a package into a predetermined space is known. For example, Japanese Unexamined Patent Application Publication No. 2019-159397 (JP 2019-159397 A) discloses planning and outputting of a loading procedure of a package for a predetermined location.

SUMMARY

For example, in a case where a package is loaded into a vehicle, such as an automobile, the amount of the package that can be loaded may vary depending on whether a loading space, such as a trunk, is empty or another package is already loaded in the loading space. Therefore, there is room for improvement in the technique for deciding the procedure for loading the package into the vehicle.

The present disclosure has been made in view of such circumstances, and improves the technique for deciding the procedure for loading the package into the vehicle.

A first aspect of the present disclosure relates to a method that is executed by an information processing device. The method includes acquiring first information regarding a vehicle, acquiring second information regarding a first product selected by a user, deciding a procedure for loading the first product into the vehicle based on the first information and the second information, and performing notification of the procedure for loading the first product.

A second aspect of the present disclosure relates to an information processing device including a controller. The controller is configured to acquire first information regarding a vehicle, acquire second information regarding a first product selected by a user, decide a procedure for loading the first product into the vehicle based on the first information and the second information, and perform notification of the procedure for loading the first product.

A third aspect of the present disclosure relates to a program. The program causes an information processing device to execute acquiring first information regarding a vehicle, acquiring second information regarding a first product selected by a user, deciding a procedure for loading the first product into the vehicle based on the first information and the second information, and performing notification of the procedure for loading the first product.

According to the aspects of the present disclosure, it is possible to improve a technique for deciding a procedure for loading a package into a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION

Hereinafter, an embodiment of the present disclosure will be described.

Outline of Embodiment

Figure 1:
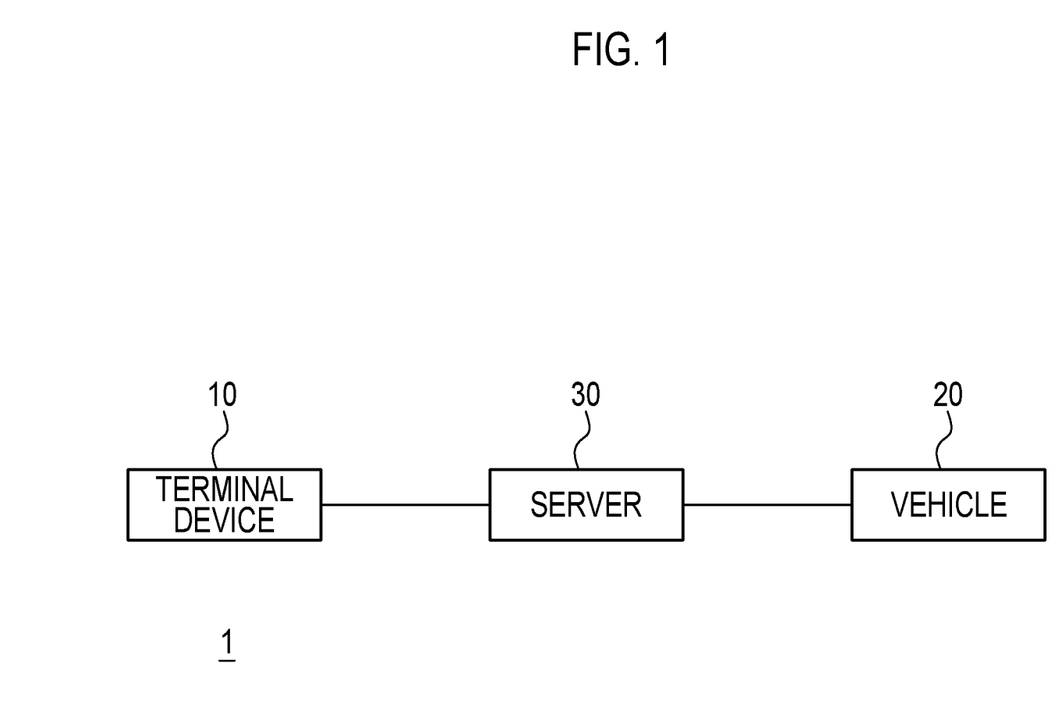
FIG. 1 is a block diagram showing a schematic configuration of a system according to an embodiment of the present disclosure.

An outline of a system 1 according to an embodiment of the present disclosure will be described with reference to FIG. 1. The system 1 includes a terminal device 10, a vehicle 20, and a server 30. The number of terminal devices 10 and vehicles 20 included in the system 1 may be randomly determined.

The terminal device 10 is any information processing device usable by a user. For example, a general-purpose information processing device, such as a smartphone, a tablet terminal, or a personal computer (PC), may be used as the terminal device 10.

The vehicle 20 is any device that can move while being loaded with a package. In the present embodiment, the vehicle 20 will be described as an automobile that a user can board, but may be an automobile that a human cannot board. The vehicle 20 has a loading space in which the package can be loaded. In the present embodiment, the loading space is, for example, a trunk room, a space in a vehicle cabin, an outside-vehicle space, such as a roof carrier or a container provided outside a vehicle, or a combination thereof, but is not limited thereto. The vehicle 20 may be capable of performing autonomous driving at levels 1 to 5 as defined in society of automotive engineers (SAE), for example.

The server 30 is connected to be communicatable with the terminal device 10 and the vehicle 20 via a network, such as the Internet. In the present embodiment, the server 30 will be described as one information processing device, but may include a plurality of information processing devices capable of communicating with one another. In the present embodiment, the server 30 is used, for example, to provide an electronic commerce (EC) service.

First, an outline of the present embodiment will be described, and details will be described below. A user can access, for example, an EC site using the terminal device 10 and purchase a product of a registered store by electronic settlement. The user can move to the store by the vehicle 20 and receive the product. When the product is received, notification of a procedure for loading the product into the vehicle 20 is sent from the server 30 to the terminal device 10, for example. The user or the worker of the store can load the product into the vehicle 20 by referring to the notified procedure.

When the product is purchased, the server 30 acquires, for example, information indicating an empty space in the loading space of the vehicle 20 as information regarding the vehicle 20. The server 30 acquires, for example, information indicating a three-dimensional shape and dimensions of the product as information regarding the product selected by the user. The server 30 decides the procedure for loading the product into the vehicle 20 based on the pieces of information, and notifies the terminal device 10 of the procedure.

As described above, according to the present embodiment, the procedure for loading the product into the vehicle 20 is decided based on both the information regarding the vehicle 20 and the information on the product. Therefore, when the product is loaded into the vehicle 20, probability of occurrence of inconvenience, such as not being able to load the product because a package is already loaded into the loading space and the vehicle 20 does not have a sufficient empty space, is reduced. Therefore, a technique for deciding a procedure for loading a package into the vehicle 20 is improved in terms of reducing the probability of occurrence of such inconvenience.

Next, each configuration of the system 1 will be described in detail.

Configuration of Terminal Device

Figure 2:
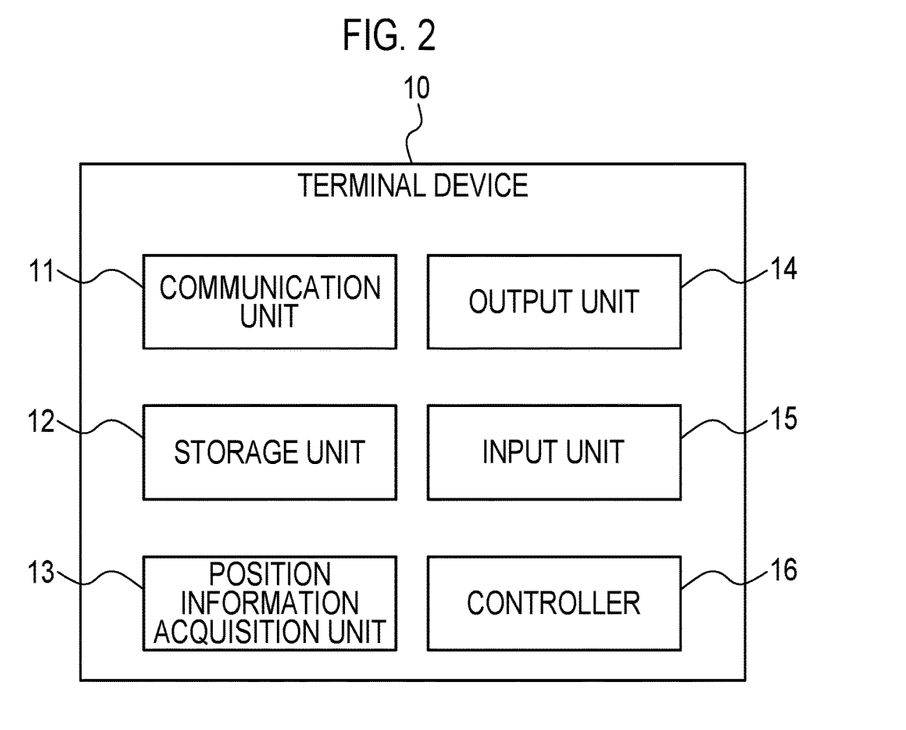
FIG. 2 is a block diagram showing a schematic configuration of a terminal device.

As shown in FIG. 2, the terminal device 10 includes a communication unit 11, a storage unit 12, a position information acquisition unit 13, an output unit 14, an input unit 15, and a controller 16.

The communication unit 11 includes one or more communication interfaces connected to a network. The communication interface conforms to a mobile communication standard, such as 4th generation (4G) or 5th generation (5G), a wired local area network (LAN) standard, or a wireless LAN standard, but is not limited thereto. In the present embodiment, the terminal device 10 is connected to be communicatable with the server 30 through the communication unit 11 and the network.

The storage unit 12 includes one or more memories. The memory is, for example, a semiconductor memory, a magnetic memory, or an optical memory, but is not limited thereto. Each of the memories included in the storage unit 12 may function as, for example, a main storage device, an auxiliary storage device, or a cache memory. The storage unit 12 stores optional information used for an operation of the terminal device 10. For example, the storage unit 12 may store a system program, an application program, embedded software, and the like. The information stored in the storage unit 12 may be updatable with information acquired from the network through, for example, the communication unit 11.

In the present embodiment, the storage unit 12 stores one or more application programs for using the EC service. The application program may be downloaded from an external application distribution server, for example, or may be pre-installed when the terminal device 10 is manufactured. The application program may be a program dedicated to the EC service, or may be a general-purpose browser application program. The operation of the terminal device 10 according to the present embodiment may be realized by one application program, or may be realized by linking a plurality of application programs.

The position information acquisition unit 13 includes one or more devices that acquire position information of the terminal device 10. Specifically, the position information acquisition unit 13 is, for example, a receiver corresponding to global positioning system (GPS), but is not limited thereto, and the position information acquisition unit 13 may be a receiver corresponding to any satellite positioning system. The position information acquired by the position information acquisition unit 13 may be used as position information of the user of the terminal device 10.

The output unit 14 includes one or more output devices that output information to notify the user of the information. The output device is, for example, a display that outputs information in a form of video image or a speaker that outputs information in a form of voice, but is not limited thereto.

The input unit 15 includes one or more input devices that detect user input. The input device is, for example, a physical key, a capacitance key, a touch screen integrally provided with the display of the output unit 14, or a microphone that receives voice input, but is not limited thereto.

The controller 16 includes one or more processors, one or more programmable circuits, one or more dedicated circuits, or a combination thereof. The processor is a general-purpose processor, such as a central processing unit (CPU) or a graphics processing unit (GPU), or a dedicated processor specialized for specific processing, but is not limited thereto. The programmable circuit is, for example, a field-programmable gate array (FPGA), but is not limited thereto. The dedicated circuit is, for example, an application specific integrated circuit (ASIC), but is not limited thereto. The controller 16 controls the operation of the entire terminal device 10.

Configuration of Vehicle

Figure 3:
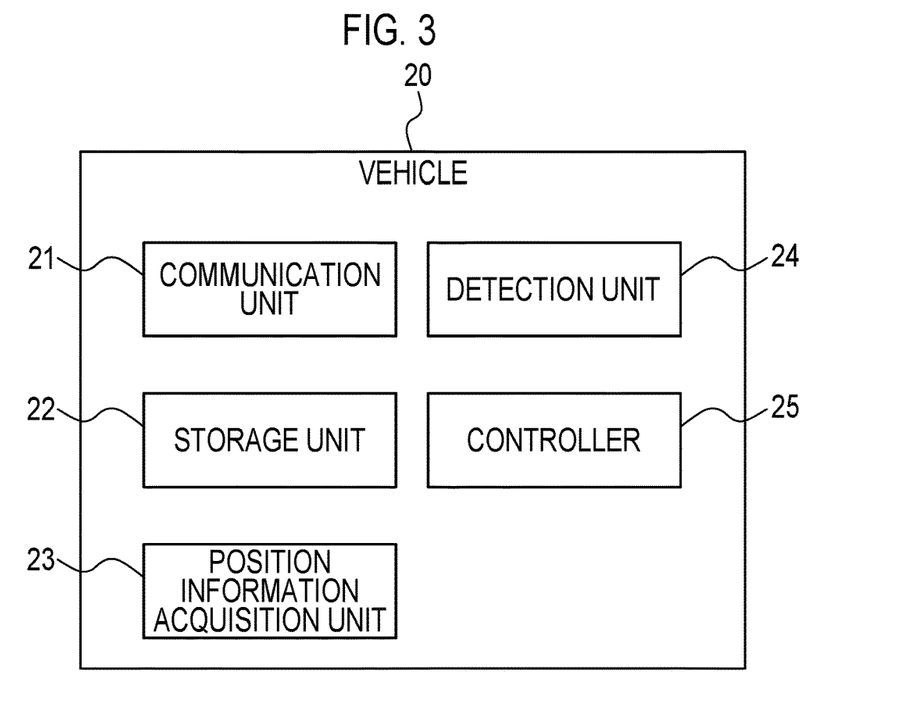
FIG. 3 is a block diagram showing a schematic configuration of a vehicle.

As shown in FIG. 3, the vehicle 20 includes a communication unit 21, a storage unit 22, a position information acquisition unit 23, a detection unit 24, and a controller 25.

The communication unit 21 includes one or more communication interfaces connected to a network. The communication interface conforms to a mobile communication standard, such as 4th generation (4G) or 5th generation (5G), but is not limited thereto. In the present embodiment, the vehicle 20 is connected to be communicatable with the server 30 through the communication unit 21 and the network.

The storage unit 22 includes one or more memories. The memory is, for example, a semiconductor memory, a magnetic memory, or an optical memory, but is not limited thereto. Each of the memories included in the storage unit 22 may function as, for example, a main storage device, an auxiliary storage device, or a cache memory. The storage unit 22 stores optional information used for an operation of the vehicle 20. For example, the storage unit 22 may store a system program, an application program, embedded software, and the like. The information stored in the storage unit 22 may be updatable with information acquired from the network through, for example, the communication unit 21.

The position information acquisition unit 23 includes one or more devices that acquire position information of the vehicle 20. Specifically, the position information acquisition unit 23 is, for example, a receiver corresponding to GPS, but is not limited thereto, and the position information acquisition unit 23 may be a receiver corresponding to any satellite positioning system. The position information acquired by the position information acquisition unit 23 may be used as position information of the user who boards the vehicle 20.

The detection unit 24 includes one or more devices that detect an empty space in the loading space of the vehicle 20. For example, the detection unit 24 may include one or more cameras provided to be able to image an inside of the loading space, and a processor that detects a three-dimensional shape and dimensions of the empty space in the loading space from the image of the camera.

The controller 25 includes one or more processors, one or more programmable circuits, one or more dedicated circuits, or a combination thereof. The processor is a general-purpose processor or a dedicated processor specialized for specific processing, but is not limited thereto. The processor may be an electronic control unit (ECU). The programmable circuit is, for example, a field-programmable gate array (FPGA), but is not limited thereto. The dedicated circuit is, for example, an application specific integrated circuit (ASIC), but is not limited thereto. The controller 25 controls the operation of the entire vehicle 20.

Configuration of Server

Figure 4:
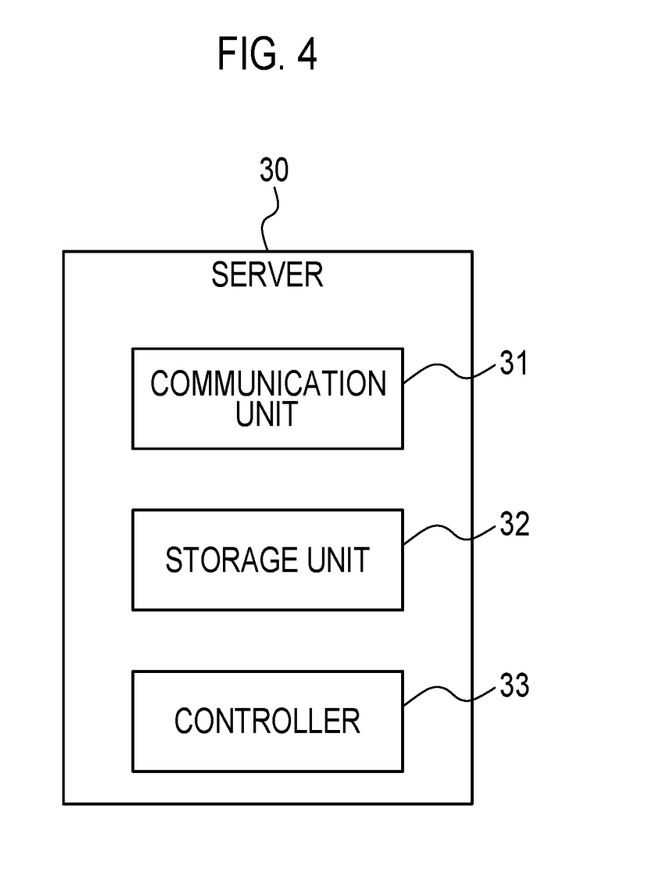
FIG. 4 is a block diagram showing a schematic configuration of a server.

As shown in FIG. 4, the server 30 includes a communication unit 31, a storage unit 32, and a controller 33.

The communication unit 31 includes one or more communication interfaces connected to a network. The communication interface conforms to, for example, a wired LAN standard or a wireless LAN standard, but is not limited thereto. In the present embodiment, the server 30 is connected to be communicatable with the terminal device 10 and the vehicle 20 through the communication unit 31 and the network.

The storage unit 32 includes one or more memories. The memory is, for example, a semiconductor memory, a magnetic memory, or an optical memory, but is not limited thereto. Each of the memories included in the storage unit 32 may function as, for example, a main storage device, an auxiliary storage device, or a cache memory. The storage unit 32 stores optional information used for an operation of the server 30. For example, the storage unit 32 may store a system program, an application program, a database, and the like. The information stored in the storage unit 32 may be updatable with information acquired from the network through, for example, the communication unit 31. In the present embodiment, the storage unit 32 stores user data.

The user data is stored for each user of an EC service provided by using the server 30. The user data includes optional information regarding the user of the EC service. For example, in the example shown in FIG. 5, the user data includes "account information", "settlement information", "product information", "vehicle information", and "driving behavior information" of the user.

Figure 5:
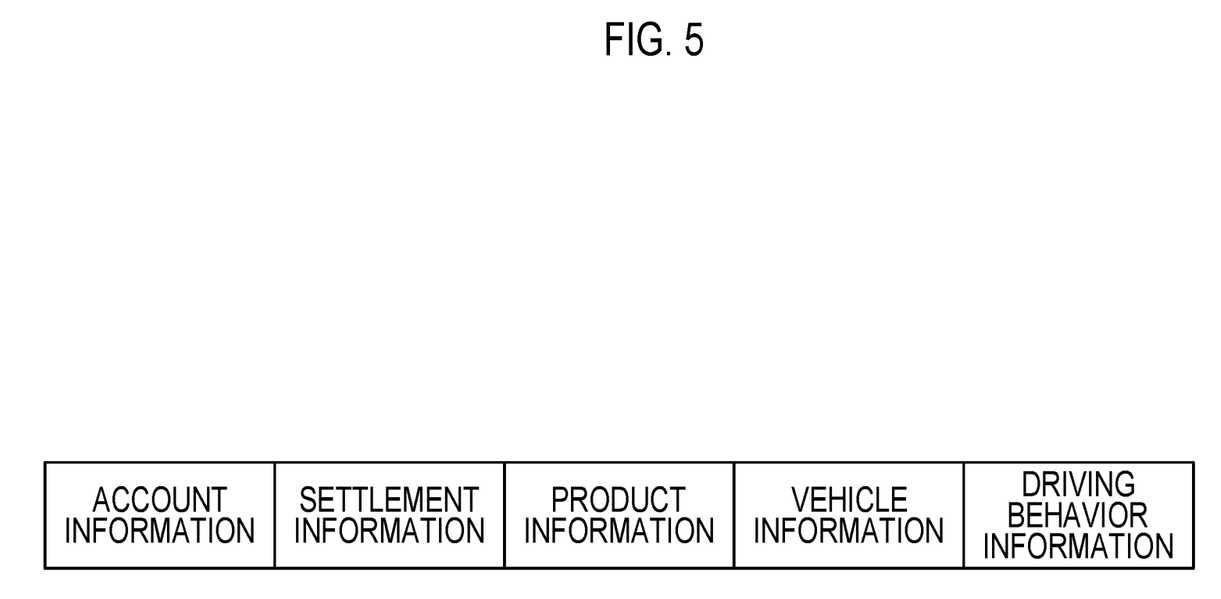
FIG. 5 is a diagram showing an example of user data stored in the server.

The account information includes optional information for the user to use the EC service. For example, the account information includes a login ID and password for logging in to the EC service, a user ID, and a user name, but is not limited thereto.

The settlement information includes optional information used for electronic settlement when the user purchases a product using the EC service. For example, the settlement information includes credit card information or bank account information, but is not limited thereto.

The product information includes optional information regarding the product selected to be purchased by the user using the EC service. For example, the product information may include information indicating a three-dimensional shape and dimensions of the product, information indicating a transportation condition of the product, and information indicating properties of the product.

Specifically, the shape and dimensions of the product may be a shape and dimensions of the product itself, or a shape and dimensions of a product in a state of being packed with a packing member, such as a corrugated cardboard. The transportation condition of the product includes any condition to be achieved when the product is transported. For example, the transportation condition may include a condition that the product is not allowed to be loaded upside down, a condition that other packages are not allowed to be loaded on a top of the product, or a condition that the product is not allowed to be loaded near other packages that are cold or hot. The information indicating the properties of the product may include, for example, information indicating that the product is cold or hot in light of a predetermined standard, but is not limited thereto.

The vehicle information includes optional information regarding the vehicle 20 used by the user to receive the purchased product at the store. For example, the vehicle information may include a vehicle ID of the vehicle 20, information indicating an empty space in the loading space, and position information of the vehicle 20. The information indicating the empty space may include the three-dimensional shape and dimensions of the empty space as described above.

The vehicle information may further include information indicating an operation method of any equipment related to the loading space of the vehicle 20. Specifically, when a trunk space that is the loading space can be expanded by, for example, sliding a backseat of the vehicle 20 or reclining a backrest of the backseat, the vehicle information may include information indicating an operation method for sliding the backseat and an operation method for reclining the backrest. More specifically, when an outside-vehicle space, such as a roof carrier or a container, is included in the loading space, the vehicle information may include information indicating an operation method for fixing a package to the roof carrier or an operation method for opening and closing the container.

Here, the vehicle 20 related to the vehicle information may be, for example, a vehicle owned by the user. In such a case, the vehicle information can be uploaded from the vehicle 20 to the server 30. Alternatively, the vehicle 20 related to the vehicle information may be a vehicle reserved by the user using an external service, such as a car sharing service. In such a case, the vehicle information can be uploaded from the vehicle 20 to the server 30 through an external system that provides a car sharing service or the like. Among the pieces of vehicle information stored in the storage unit 32 of the server 30, for example, the information indicating the empty space in the loading space and the position information of the vehicle 20 can be updated each time the vehicle information is uploaded. Uploading of the vehicle information may be performed periodically, or may be performed at any timing in response to a request from the terminal device 10, the vehicle 20, or the server 30.

The driving behavior information includes optional information indicating a driving behavior when the user drives a vehicle, such as an automobile. For example, the driving behavior information may include information indicating a behavior of acceleration change of an automobile. Any method can be employed to decide the information indicating the behavior of the acceleration change. For example, information on acceleration at the time when an automobile driven by the user is started, stopped, or turned to the right or left is uploaded from the automobile to the server 30. The server 30 stores the uploaded information on acceleration in association with the user ID. Then, the server 30 calculates a statistic value of the acceleration change (for example, an average value, a median value, or a mode value), compares the statistic value with a predetermined reference value to evaluate the speed of the acceleration change, and stores the evaluation result as the driving behavior information. The speed of the acceleration change may be evaluated in two stages (for example, "gentle" or "rapid"), or may be evaluated in three or more stages.

The controller 33 shown in FIG. 4 includes one or more processors, one or more programmable circuits, one or more dedicated circuits, or a combination thereof. The processor is a general-purpose processor, such as a CPU or GPU, or a dedicated processor specialized for specific processing, but is not limited thereto. The programmable circuit is, for example, an FPGA, but is not limited thereto. The dedicated circuit is, for example, an ASIC, but is not limited thereto. The controller 33 controls the operation of the entire server 30.

Operation Flow of Server

Figure 6:
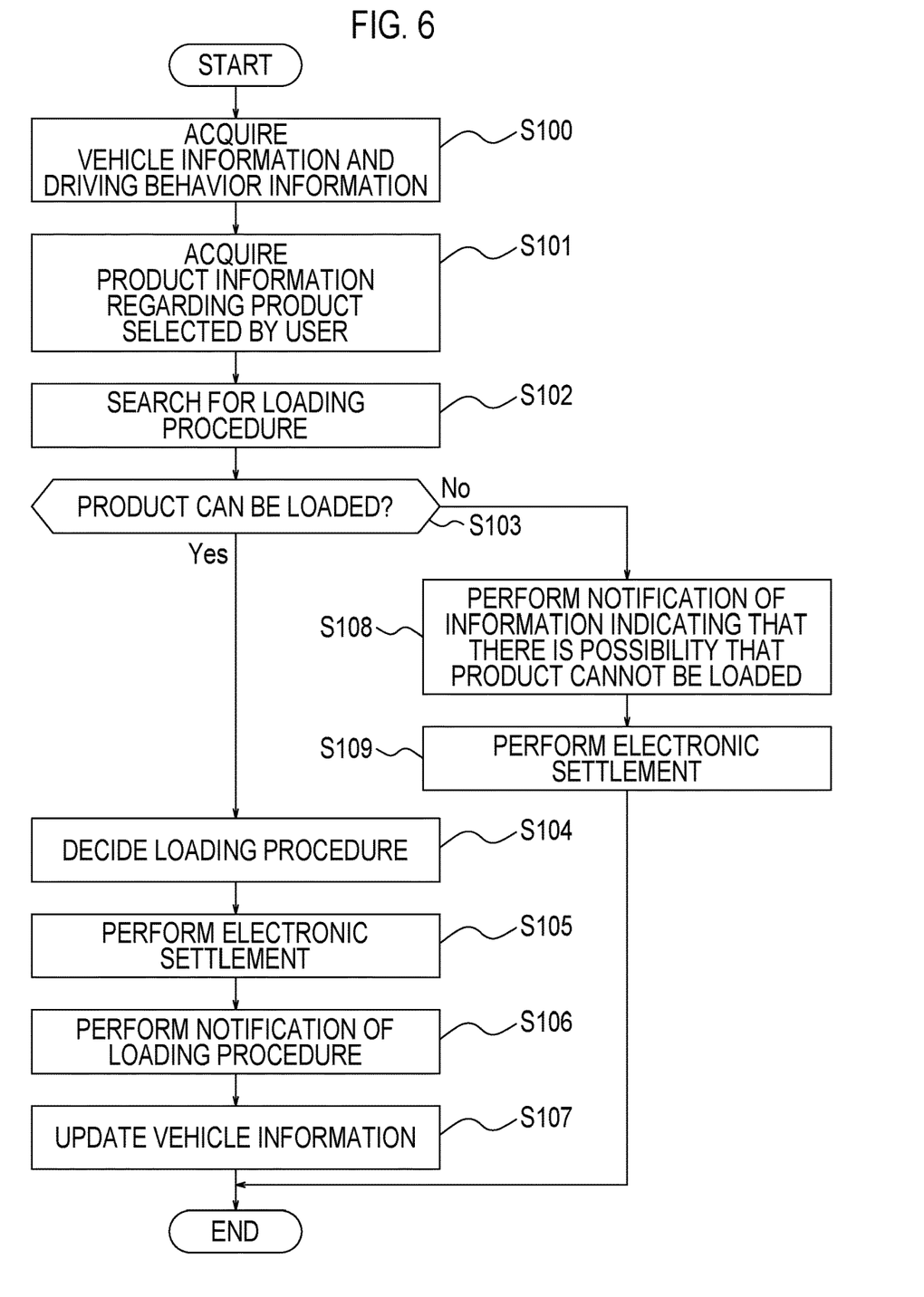
FIG. 6 is a flowchart showing an example of an operation of the server.

The operation of the server 30 will be described with reference to FIG. 6.

Step S100: The controller 33 acquires vehicle information regarding the vehicle 20 and driving behavior information of the user.

Specifically, the controller 33 receives vehicle information from the vehicle 20 through the communication unit 31 and stores the vehicle information in the storage unit 32 as a part of the user data. The controller 33 acquires the vehicle information stored in the storage unit 32. As described above, the vehicle information includes, for example, the information indicating the empty space of the loading space of the vehicle 20. In addition, the controller 33 acquires the driving behavior information of the user stored in the storage unit 32. As described above, the driving behavior information includes the information indicating the behavior of the acceleration change of the automobile when the user drives the automobile.

Step S101: The controller 33 acquires the product information regarding the product selected by the user.

Specifically, the controller 33 acquires, from the storage unit 32, product information of each product selected on, for example, the EC site and added to a virtual cart by, for example, the user using the terminal device 10. Here, the product information of each product that can be selected by the user on the EC site may be stored in the storage unit 32 in advance, or may be acquired from an external database in which the product information of each product is stored.

Step S102: The controller 33 searches for a procedure for loading each product in the empty space in the loading space of the vehicle 20 based on the vehicle information in Step S100 and the product information in Step S101.

Specifically, when the controller 33 receives a request to proceed to a settlement procedure for the product added to the virtual cart from the terminal device 10 through, for example, the communication unit 31, the controller 33 searches for the procedure for loading each product in the empty space in the loading space of the vehicle 20 such that the product can be accommodated therein based on the vehicle information and the product information. The procedure includes information, such as an order in which products are loaded, contents of work, and arrangement of the products after loading, but is not limited thereto. The procedure may include, for example, a procedure for temporarily removing a package already loaded into the loading space of the vehicle 20, a procedure for presenting an operation method of an equipment provided in the vehicle 20 (for example, an operation method for sliding the backseat) to the user, or a procedure for operating the equipment.

Any method can be employed to search for the procedure. For example, a method for solving an optimization problem using, as a solution, the procedure for loading each product in the empty space such that the product can be accommodated therein by using the three-dimensional shape and dimensions of the empty space and each product can be employed. As the method for solving such an optimization problem, an algorithm, such as a branch-and-bound method, a predetermined rule-based solution method, or meta-heuristics, can be employed.

Here, the controller 33 may search for the procedure to satisfy the transportation condition of each product. In such a case, a procedure for loading each product in the empty space in the loading space of the vehicle 20 such that the transportation condition that the product is not to allowed to be loaded upside down is satisfied and the product can be accommodated therein is searched for.

In addition, the controller 33 may search for the procedure based on the driving behavior information of the user in addition to the vehicle information and the product information. For example, as described above, the procedure is searched for such that stacking of products in a vertical direction is avoided as the behavior of the acceleration change when the user drives the automobile is more rapid. In other words, the controller 33 selects, as an optimum solution, a loading procedure in which the stacking in the vertical direction is less among loading procedures of a plurality of patterns found through the search as the behavior of the acceleration change when the user drives the automobile is more rapid.

Step S103: The controller 33 determines whether or not each product can be loaded into the empty space in the loading space of the vehicle 20. When determination is made that the product can be loaded (Step S103—Yes), the process proceeds to Step S104. On the other hand, when determination is made that the product cannot be loaded (Step S103—No), the process proceeds to Step S108.

Specifically, when a procedure for loading each product in the empty space is found in Step S102, the controller 33 determines that the product can be loaded. On the other hand, when the procedure is not found in Step S102, determination is made that the product cannot be loaded.

Step S104: When determination is made in Step S103 that the product can be loaded (Step S103—Yes), the controller 33 decides a loading procedure for loading each product. Specifically, the controller 33 decides at least one procedure found in Step S102 as the loading procedure.

Step S105: The controller 33 performs electronic settlement for each product using the settlement information of the user acquired from the storage unit 32.

Step S106: The controller 33 notifies, for example, the terminal device 10 of the user of the loading procedure in Step S104. By the notification of the loading procedure, the terminal device 10 can notify the user of the loading procedure through the output unit 14.

Step S107: The controller 33 updates the vehicle information based on the product information of each purchased product.

Specifically, the controller 33 calculates a three-dimensional shape and dimensions of the empty space after the loading of each product, assuming that each product is loaded into the empty space in the loading space of the vehicle 20 according to the loading procedure in Step S104. The controller 33 updates the information indicating the empty space among the pieces of vehicle information stored in the storage unit 32 to information indicating the empty space after the loading of each product. By updating the information indicating the empty space, for example, when the user continues to select a product on the EC site, probability of occurrence of inconvenience that both the purchased product and the newly purchased product cannot be loaded into the vehicle 20 can be reduced.

Here, for example, when the user moves to the store by the vehicle 20 and receives notification from the terminal device 10 or the vehicle 20 that each product is actually loaded, the controller 33 may update, in a case where the vehicle information (here, the information indicating the empty space) is uploaded from the vehicle 20 after the reception of the notification, the vehicle information stored in the storage unit 32 with the uploaded vehicle information.

Step S108: When determination is made in Step S103 that the product cannot be loaded (Step S103—No), the controller 33 notifies, for example, the terminal device 10 of information indicating that there is a possibility that each product cannot be loaded into the empty space in the loading space of the vehicle 20. By the notification of the information, the terminal device 10 can notify the user of the information through the output unit 14 and make the user confirm whether or not to proceed to electronic settlement of the product.

Step S109: When a response indicating that the operation proceeds to the electronic settlement is received from the terminal device 10 through, for example, the communication unit 31, the controller 33 performs electronic settlement for each product using the settlement information of the user acquired from the storage unit 32. Note that, when the response indicating that the operation does not proceed to the electronic settlement is received from the terminal device 10, the operation in Step S109 is omitted.

Specific Example of Loading Procedure

A specific example of the procedure for loading the product in the empty space of the loading space of the vehicle 20 will be described with reference to FIGS. 7 and 8. Here, for the sake of simplicity of description, assumption is made that the loading space of the vehicle 20 is a trunk space. In addition, assumption is made that no other packages are loaded into the trunk space in an initial state.

Figure 7:
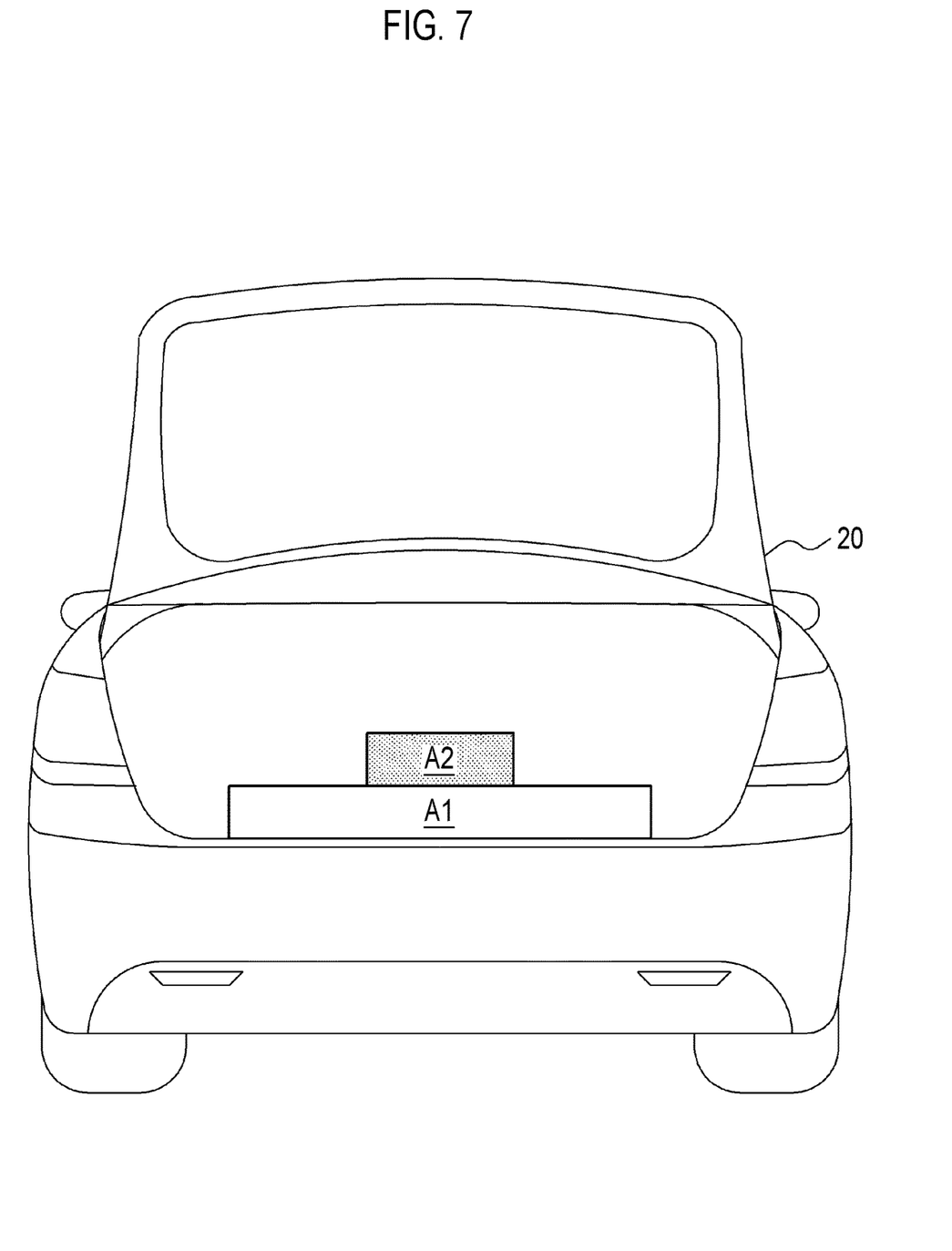
FIG. 7 is a schematic view showing a state in which a product is loaded into the vehicle.

With reference to FIG. 7, a loading procedure at a store A when the user purchases products A1, A2 at the store A registered on the EC site will be described. No transportation condition is set for the product A1. On the other hand, the product A2 is set with a transportation condition that other packages are not allowed to be loaded on the product A2. In such a case, the loading procedure at the store A may include, for example, the following information.

(1) First, the product A1 is loaded.

(2) The product A2 is loaded on the product A1.

When the products A1, A2 are loaded according to the loading procedure, arrangement of the products A1, A2 in the trunk space is such that the product A2 is placed on the product A1 as shown in FIG. 7. The loading procedure at the store A may include information, such as an image showing the arrangement of the products A1, A2, as shown in FIG. 7. Notification of the loading procedure can be sent to the user through the terminal device 10 when the user moves to the store A by the vehicle 20 to receive the products A1, A2. The user who arrives at the store A can load the products A1, A2 into the vehicle 20 by referring to the loading procedure.

Note that, Step S100 to Step S107 are executed in order to decide the loading procedure at the store A. Specifically, through Step S100 to Step S103, the loading procedure at the store A is decided in Step S104. Subsequently, through Step S105 and Step S106, the vehicle information is updated in Step S107.

Figure 8:
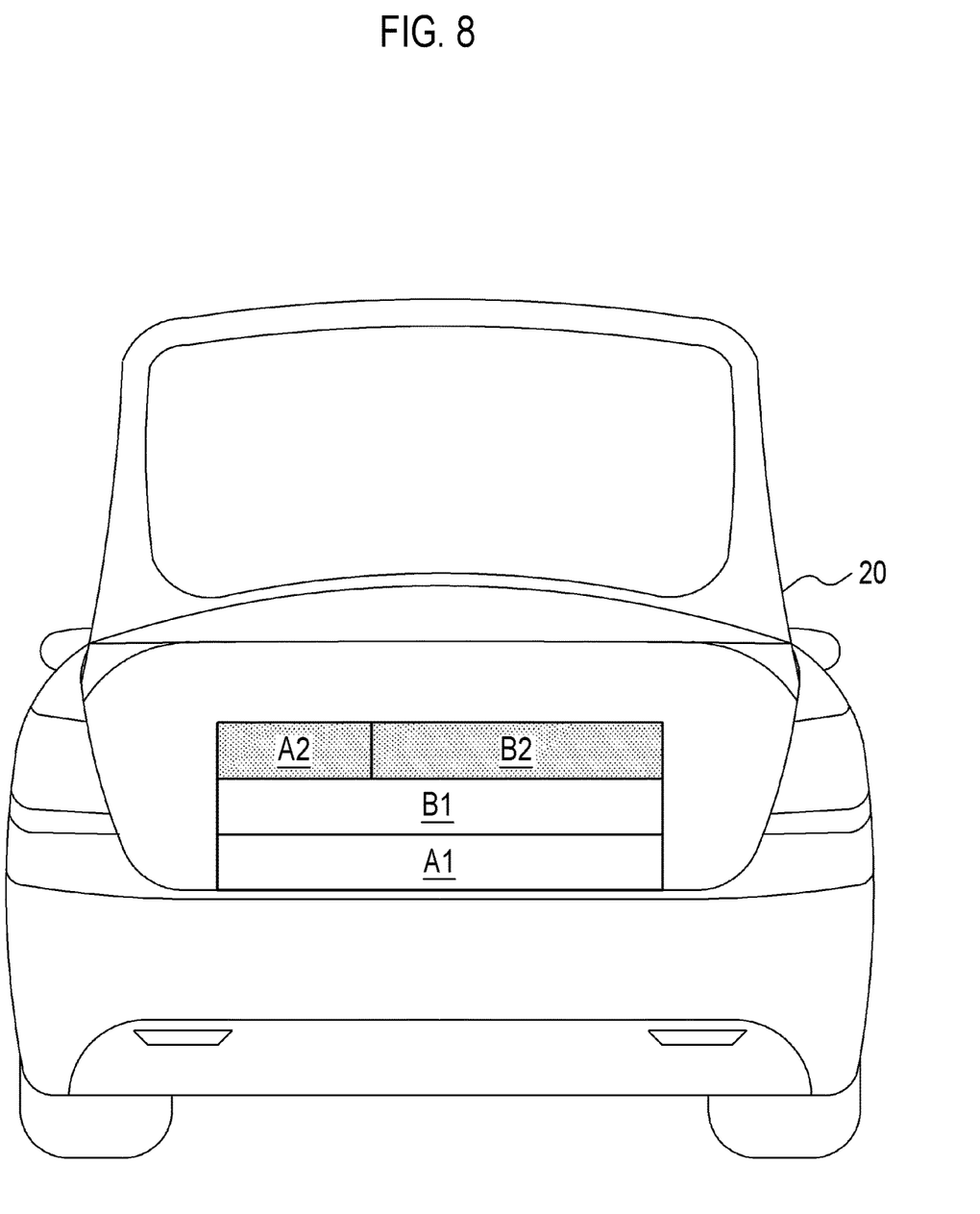
FIG. 8 is a schematic view showing a state in which a product is loaded into the vehicle.

With reference to FIG. 8, a loading procedure when the user purchases the products A1, A2 and then purchases products B1, B2 at a store B registered on the EC site in succession will be described. No transportation condition is set for the product B1. On the other hand, the product B2 is set with a transportation condition that other packages are not allowed to be loaded on the product B2. In addition, when the products B1, B2 are loaded, the products A1, A2 are already loaded. In such a case, the loading procedure at the store B may include, for example, the following information.

(1) First, the product A2 for which the transportation condition is set is temporarily removed.

(2) Subsequently, the product B1 is loaded on the product A1.

(3) Subsequently, the products A2, B2 are loaded side by side on the product B1.

When the products B1, B2 are loaded according to the loading procedure, arrangement of the products A1, A2, B1, B2 in the trunk space is such that the product B1 is placed on the product A1 and the products A2, B2 are placed on the product B1 as shown in FIG. 8. The loading procedure at the store B may include information, such as an image showing the arrangement of the products A1, A2, B1, B2, as shown in FIG. 8. Notification of the loading procedure can be sent to the user through the terminal device 10 when the user moves to the store A by the vehicle 20 to load the products A1, A2 and then moves to the store B in succession. The user who arrives at the store B can load the products B1, B2 into the vehicle 20 by referring to the loading procedure.

Note that, Step S101 to Step S107 are executed again in order to decide the loading procedure at the store B. Specifically, after the vehicle information is updated in Step S107 of the first time, the controller 33 of the server 30 newly acquires the pieces of product information of the products B1, B2 in Step S101 of the second time. Subsequently, in Step S102 of the second time, the controller 33 searches for a procedure for loading the products B1, B2 into the vehicle 20 based on the updated vehicle information and the pieces of product information of the products A1, A2, B1, B2. Here, the controller 33 searches for the procedure for loading the products B1, B2 into the vehicle 20 to satisfy transportation conditions of the products A1, A2, B1, B2, respectively. Subsequently, through Step S103 of the second time, the controller 33 decides the procedure for loading the products B1, B2 in Step S104. Subsequently, through Step S105 of the second time, the controller 33 performs notification of the loading procedure at the store B in Step S106. Then, in Step S107 of the second time, the controller 33 updates the vehicle information based on the pieces of product information of the products A1, A2, B1, B2.

As described above, the server 30 according to the present embodiment decides the procedure for loading the product into the vehicle 20 based on the vehicle information of the vehicle 20 and the product information of the product selected by the user.

With such a configuration, when the product is loaded into the vehicle 20, probability of occurrence of inconvenience, such as not being able to load the product because a package is already loaded into the loading space and the vehicle 20 does not have a sufficient empty space, is reduced. Therefore, a technique for deciding a procedure for loading a package into the vehicle 20 is improved in terms of reducing the probability of occurrence of such inconvenience.

Although the present disclosure has been described with reference to the drawings and examples, it is to be noted that various modifications and variations may be made based on the present disclosure by those skilled in the art. Therefore, such modifications and variations are to be understood as included within the scope of the present disclosure. For example, functions and the like included in each component or each step may be rearranged in any logically consistent way, and a plurality of components or steps may be combined into one or divided.

For example, an embodiment in which some or all of the operations executed by the terminal device 10, the vehicle 20, or the server 30 in the above-described embodiment are executed by another device is also possible. For example, in the above-described embodiment, an example in which the detection unit 24 of the vehicle 20 detects the three-dimensional shape and dimensions of the empty space in the loading space of the vehicle 20 has been described. However, an embodiment in which the server 30 executes the detection of the empty space is also possible. In such a case, the vehicle 20 transmits a captured image of the loading space to the server 30, and the server 30 detects the empty space based on the captured image.

Further, for example, an embodiment in which some or all of the operations executed by the server 30 in the above-described embodiment are distributed to a plurality of information processing devices capable of communicating with one another is also possible. For example, a first server of an EC service provider, a second server of a retailer registered on the EC service, and a third server of a vehicle manufacturer or a car sharing service provider may cooperate to execute the same operation as the server 30.

In the above-described embodiment, an example in which a notification destination of the loading procedure for loading the product into the vehicle 20 is the terminal device 10 of the user has been described. However, the notification destination of the loading procedure is not limited to the terminal device 10. For example, notification of the loading procedure may be sent to the vehicle 20 or a terminal device used in a store selling the product. Such a configuration can be employed, for example, when the vehicle 20 can be moved to the store by autonomous driving in an unmanned manner. For example, the worker of the store can load the product into the vehicle 20 by referring to the loading procedure notified to the vehicle 20 or the terminal device used in the store. In such a case, the user does not need to carry the terminal device 10 and move to the store by the vehicle 20.

For example, an embodiment in which a general-purpose information processing device functions as the terminal device 10 or the server 30 according to the above-described embodiment is also possible. Further, an embodiment in which the operation of the vehicle 20 according to the above-described embodiment is performed on a general-purpose information processing device that can be used in the vehicle 20, such as a car navigation device in which an application program can be installed, is also possible. Specifically, a program describing processing contents for realizing each function of the terminal device 10, the vehicle 20, or the server 30 according to the above-described embodiment is stored in a memory of the information processing device, and the program is read out and executed by a processor of the information processing device. Therefore, the disclosure according to the present embodiment can also be realized as a program that can be executed by a processor or a non-transitory computer-readable medium that stores the program.

What is claimed is:

1. A method that is executed by an information processing device, the method comprising:
    acquiring first information regarding a vehicle including an image captured of a loading space of the vehicle, the vehicle including an autonomous vehicle;
    acquiring second information regarding a first product selected by a user to be loaded at a first location, the second information indicating whether the first product is allowed to be loaded under another product;
    deciding a procedure for loading the first product into the vehicle based on the first information and the second information;
    sending a notification of the procedure for loading the first product to the vehicle;
    determining whether or not the first product is loadable into the vehicle based on the first information and the second information;
    performing electronic settlement of the first product when determination is made that the first product is loadable, and causing, in response to the notification and when the determination is made that the first product is loadable into the vehicle, the vehicle to execute autonomous driving in an unmanned manner to a store that sells the first product;
    performing notification of information making the user confirm whether or not to proceed to the electronic settlement of the first product when determination is made that the first product is not loadable;
    receiving a first response confirming to proceed to the electronic settlement of the first product from the user;
    performing the electronic settlement of the first product in response to the first response received from the user;
    updating the first information based on the second information;
    acquiring new second information regarding a second product selected by the user to be loaded at a second location;
    deciding a procedure for loading the second product into the vehicle based on the updated first information and the new second information, the procedure includes temporarily removing the first product from the vehicle and loading the first product on top of the second product when the second information indicates that the first product is not allowed to be loaded under another product;
    sending a notification of the procedure for loading the second product to the vehicle;
    determining whether the second product is loadable into the vehicle based on the updated first information and the new second information;
    performing electronic settlement of the second product when determination is made that the second product is loadable;
    performing notification of information making the user confirm whether or not to proceed to the electronic settlement of the second product when determination is made that the second product is not loadable;
    receiving a second response confirming to proceed to the electronic settlement of the second product from the user; and
    performing the electronic settlement of the second product in response to the second response received from the user.

2. The method according to claim 1, wherein:
the first information has information indicating an empty space in a loading space of the vehicle;
the second information regarding the first product has information indicating a dimension of the first product; and
the procedure for loading the first product is decided such that the first product is accommodatable in the empty space.

3. The method according to claim 1, wherein:
the second information has information indicating a transportation condition of the first product; and
the procedure for loading the first product is decided to satisfy the transportation condition of the first product.

4. The method according to claim 1, further comprising acquiring third information indicating a driving behavior when the user drives the vehicle,
wherein the procedure for loading the first product is decided based on the first information, the second information, and the third information.

5. The method according to claim 1, further comprising:
performing notification of information indicating a possibility that the first product is not loadable into the vehicle when determination is made that the first product is not loadable.

6. The method according to claim 5, further comprising updating the first information based on the second information when the electronic settlement of the first product is completed, wherein:
the first information has information indicating an empty space in a loading space of the vehicle; and
the updated first information has information indicating the empty space in the loading space when the first product is loaded.

7. The method according to claim 6, wherein:
the new second information is acquired after updating the first information;
the second information has information indicating a transportation condition of the first product;
the new second information has information indicating a transportation condition of the second product; and
the procedure for loading the second product is decided to satisfy transportation conditions of both the first product and the second product.

8. An information processing device comprising a controller,
wherein the controller is configured to:
acquire first information regarding a vehicle including an image captured of a loading space of the vehicle, the vehicle including an autonomous vehicle,
acquire second information regarding a first product selected by a user to be loaded at a first location, the second information indicating whether the first product is allowed to be loaded under another product,
decide a procedure for loading the first product into the vehicle based on the first information and the second information,
send a notification of the procedure for loading the first product to the vehicle,
determine whether or not the first product is loadable into the vehicle based on the first information and the second information,
perform electronic settlement of the first product when determination is made that the first product is loadable, and cause, in response to the notification and when the determination is made that the first product is loadable into the vehicle, the vehicle to execute autonomous driving in an unmanned manner to a store that sells the first product,
perform notification of information making the user confirm whether or not to proceed to the electronic settlement of the first product when determination is made that the first product is not loadable,
receive a first response confirming to proceed to the electronic settlement of the first product from the user,
perform the electronic settlement of the first product in response to the first response received from the user;
update the first information based on the second information;
acquire new second information regarding a second product selected by the user to be loaded at a second location;
decide a procedure for loading the second product into the vehicle based on the updated first information and the new second information, the procedure includes temporarily removing the first product from the vehicle and loading the first product on top of the second product when the second information indicates that the first product is not allowed to be loaded under another product;
send a notification of the procedure for loading the second product to the vehicle;
determine whether the second product is loadable into the vehicle based on the updated first information and the new second information;
perform electronic settlement of the second product when determination is made that the second product is loadable;
perform notification of information making the user confirm whether or not to proceed to the electronic settlement of the second product when determination is made that the second product is not loadable;
receive a second response confirming to proceed to the electronic settlement of the second product from the user; and
perform the electronic settlement of the second product in response to the second response received from the user.

9. The information processing device according to claim 8, wherein:
the first information has information indicating an empty space in a loading space of the vehicle;
the second information has information indicating a dimension of the first product; and
the procedure for loading the first product is decided such that the first product is accommodatable in the empty space.

10. The information processing device according to claim 8, wherein:
the second information has information indicating a transportation condition of the first product; and
the procedure for loading the first product is decided to satisfy the transportation condition of the first product.

11. The information processing device according to claim 8, wherein:
the controller is configured to acquire third information indicating a driving behavior when the user drives the vehicle; and
the procedure for loading the first product is decided based on the first information, the second information, and the third information.

12. The information processing device according to claim 8, wherein the controller is configured to perform notification of information indicating a possibility that the first product is not loadable into the vehicle when determination is made that the first product is not loadable.

13. The information processing device according to claim 12, wherein:
the controller is configured to update the first information based on the second information when the electronic settlement of the first product is completed;
the first information has information indicating an empty space in a loading space of the vehicle; and
the updated first information has information indicating the empty space in the loading space when the first product is loaded.

14. The information processing device according to claim 13, wherein:
the new second information is acquired after updating the first information;
the second information has information indicating a transportation condition of the first product;
the new second information has information indicating a transportation condition of the second product; and
the procedure for loading the second product is decided to satisfy transportation conditions of both the first product and the second product.

15. A non-transitory computer readable storage medium storing a program causing an information processing device to execute:
acquiring first information regarding a vehicle including an image captured of a loading space of the vehicle, the vehicle including an autonomous vehicle,
acquiring second information regarding a first product selected by a user to be loaded at a first location, the second information indicating whether the first product is allowed to be loaded under another product,
deciding a procedure for loading the first product into the vehicle based on the first information and the second information,
sending a notification of the procedure for loading the first product to the vehicle,
determining whether or not the first product is loadable into the vehicle based on the first information and the second information,
performing electronic settlement of the first product when determination is made that the first product is loadable, and causing, in response to the notification and when the determination is made that the first product is loadable into the vehicle, the vehicle to execute autonomous driving in an unmanned manner to a store that sells the first product,
performing notification of information making the user confirm whether or not to proceed to the electronic settlement of the first product when determination is made that the first product is not loadable,
receiving a first response confirming to proceed to the electronic settlement of the first product from the user,
performing the electronic settlement of the first product in response to the first response received from the user,
updating the first information based on the second information,
acquiring new second information regarding a second product selected by a user to be loaded at a second location,
deciding a procedure for loading the second product into the vehicle based on the updated first information and the new second information, the procedure includes temporarily removing the first product from the vehicle and loading the first product on top of the second product when the second information indicates that the first product is not allowed to be loaded under another product,
sending a notification of the procedure for loading the second product,
determining whether the second product is loadable into the vehicle based on the updated first information and the new second information,
performing electronic settlement of the second product when determination is made that the second product is loadable,
performing notification of information making the user confirm whether or not to proceed to the electronic settlement of the second product when determination is made that the second product is not loadable,
receiving a second response confirming to proceed to the electronic settlement of the second product from the user, and
performing the electronic settlement of the second product in response to the second response received from the user.

16. The non-transitory computer readable storage medium according to claim 15, wherein the program causes the information processing device to further execute
performing notification of information indicating a possibility that the first product is not loadable into the vehicle when determination is made that the first product is not loadable.

17. The non-transitory computer readable storage medium according to claim 16, wherein the program causes the information processing device to further execute updating the first information based on the second information when the electronic settlement of the first product is completed, wherein:
the first information has information indicating an empty space in a loading space of the vehicle; and
the updated first information has information indicating the empty space in the loading space when the first product is loaded.

18. The non-transitory computer readable storage medium according to claim 17, wherein:
the new second information is acquired after updating the first information;
the second information has information indicating a transportation condition of the first product;
the new second information has information indicating a transportation condition of the second product; and
the procedure for loading the second product is decided to satisfy transportation conditions of both the first product and the second product.

* * * * *